United States Patent
Nukui et al.

[19]

[11] Patent Number: 5,808,286
[45] Date of Patent: Sep. 15, 1998

[54] DATA SYMBOL READER UTILIZING AMBIENT LIGHT ILLUMINATION

[75] Inventors: Makoto Nukui; Shuzo Seo; Takeharu Shin; Nobuhiro Tani; Yukihiro Ishizuka, all of Tokyo, Japan

[73] Assignee: Asahi Kogaku Kogyo Kabushiki Kaisha, Tokyo, Japan

[21] Appl. No.: 660,191

[22] Filed: Jun. 3, 1996

[30] Foreign Application Priority Data

Jun. 5, 1995 [JP] Japan .................................... 7-161462

[51] Int. Cl.⁶ ....................................................... G06K 7/10
[52] U.S. Cl. ........................... 235/472; 235/454; 235/455; 235/462; 235/470
[58] Field of Search ................................... 235/472, 454, 235/455, 462, 470

[56] References Cited

U.S. PATENT DOCUMENTS

| | | | |
|---|---|---|---|
| 4,250,488 | 2/1981 | Haupt et al. | 235/455 X |
| 4,315,245 | 2/1982 | Nakahara et al. | 235/455 X |
| 4,734,566 | 3/1988 | Senda et al. | 235/455 |
| 4,743,773 | 5/1988 | Katana et al. | 235/455 X |
| 4,933,538 | 6/1990 | Heiman et al. | 235/455 X |
| 5,144,117 | 9/1992 | Hasegawa et al. | 235/455 |
| 5,270,525 | 12/1993 | Ukai et al. | 235/462 X |
| 5,382,782 | 1/1995 | Hasegawa et al. | 235/455 |
| 5,408,084 | 4/1995 | Brandorff et al. | 235/472 X |
| 5,428,212 | 6/1995 | Tani et al. | 235/472 |
| 5,567,934 | 10/1996 | Zheng et al. | 235/472 X |
| 5,597,997 | 1/1997 | Obata et al. | 235/455 |
| 5,600,116 | 2/1997 | Seo et al. | 235/455 |
| 5,648,650 | 7/1997 | Sugifune et al. | 235/455 X |

FOREIGN PATENT DOCUMENTS

| | | |
|---|---|---|
| 0585595 | 3/1994 | European Pat. Off. . |
| 0602637 | 6/1994 | European Pat. Off. . |
| 2038054 | 11/1977 | Germany . |
| 62-166478 | 7/1987 | Japan . |
| 63-231687 | 9/1988 | Japan . |
| 1121986 | 5/1989 | Japan . |
| 2280953 | 2/1995 | United Kingdom . |

OTHER PUBLICATIONS

United Kingdom Search Report, Bob Clark, Oct. 1996.

*Primary Examiner*—Donald T. Hajec
*Assistant Examiner*—Michael G. Lee
*Attorney, Agent, or Firm*—Greenblum & Bernstein, P.L.C.

[57] ABSTRACT

A casing, including a grip portion and a head portion, houses a pair of light sources for illumination, an image sensing device, an optical system for forming an image on the image sensing device, a photosensor for detecting the luminance of symbol reading area, a signal processing circuit, and a light quantity detection circuit. The housing extends from the head portion towards the symbol reading area. An ambient light window is provided in the housing for introducing ambient light into the symbol reading area. A light source driving circuit controls an amount of light emitted by the light source, by increasing or decreasing the amount of light, such that the combined ambient light and light source illumination is between predetermined levels. A selector is provided for selecting between a first mode, in which a maximum illumination is decreased to an upper limit of an acceptable illumination range, and a second mode, in which a minimum illumination is increased to a lower limit of an acceptable illumination range.

25 Claims, 7 Drawing Sheets

DATA SYMBOL READER UTILIZING AMBIENT LIGHT ILLUMINATION

BACKGROUND OF THE INVENTION

The present invention relates to data symbol reading device for reading coded information such as two-dimensional data symbols.

Bar codes, and associated methods and devices for coding and reading bar code information, have come to be widely used for applications such as point-of-sale (POS) systems. However, since bar codes are in a one-dimensional format, in which the coding and reading of data are based on a one dimensional arrangement of bars, such systems are limited in terms of the amount of information that can be coded and read.

Data symbols, in which a mosaic or tessellated pattern is arranged in, for example, a black and white, two-dimensional symbol, have been developed in order to hold more information. Appropriate coding and reading devices have also been developed for such data symbols. These reading devices may be largely classified into two groups: those in which an image sensing device or an area sensor, such as a CCD, is used to read the data symbol pattern in two dimensions simultaneously; and those in which a line sensor is used to perform a main scan of each line, and the reading device and data symbol are moved relative to each other in a direction perpendicular to the main scanning direction to perform sub-scanning, thereby reading in two dimensions.

Reading devices which use an image sensing device (i.e., an area sensor) do not require relative movement between the reading unit and the data symbol for sub-scanning, and are thus able to read data symbols in a shorter time.

Figure 1:
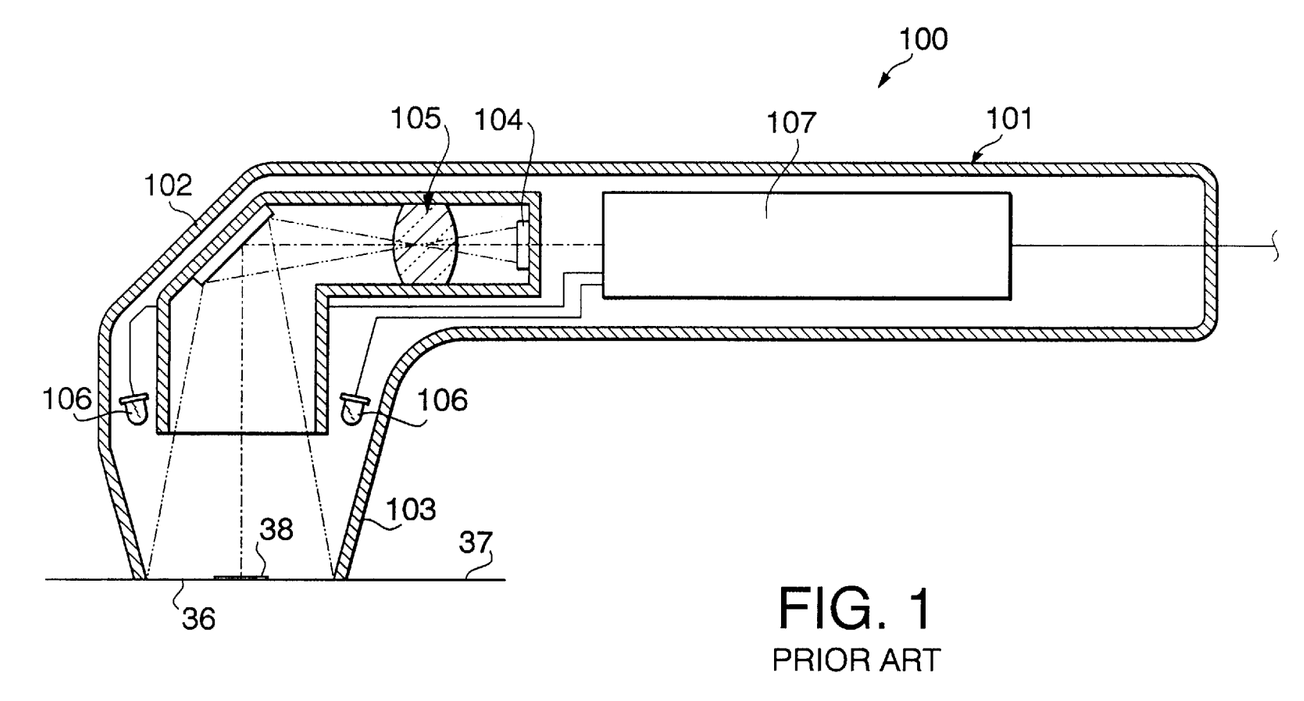
FIG. 1 is a perspective view showing a conventional data symbol reading device.

As shown in FIG. 1, a conventional data reading device 100 includes an image sensing device (CCD) 104, an optical system 105 for forming the image of a data symbol in a symbol reading area 36 on an image sensing device, and a light source (LPD) 106 for illumination, all provided in a head part 102 at one end of a casing 101. A housing 103 extends from the head part 102 towards the symbol reading area 36. The symbol reading area 36 substantially coincides with the front opening of the housing 103.

When a trigger switch is turned ON and a data symbol 38 is positioned inside the symbol reading area 36, a light source 106 is lit to illuminate the symbol reading area 36. The light reflected from the symbol reading area 36 is formed by the optical system 1 on the light receiving surface of the image sensing device 104. The image signals are output from the image sensing device 104, are processed by a signal processing circuit 107, and are decoded to obtain the data encoded in the data 38.

In the conventional data symbol reading device 100, the illumination of the symbol reading area 36 is provided only by the light source 106. Accordingly, a plurality of light sources, incurring a large power consumption, are required to illuminate the entire symbol reading area 36. The luminance is maintained at a standard luminance at all times. Consequently, the lifetime of the battery or storage cell used is short, and the light sources and associated parts tend to deteriorate quickly. If an AC power supply is used instead of a battery or cell, noise is generated, causing reading errors and malfunctions of the device.

SUMMARY OF THE INVENTION

It is therefore an object of the present invention to provide an improved data symbol reading device for which the power consumption used for illumination of the symbol reading area is low.

The present invention is directed to a data symbol reader that meets this need. According to one aspect of the present invention, a data symbol reader includes an image sensing device; an optical system for forming an image of a data symbol in a symbol reading area of the image sensing device; a light source for illuminating the symbol reading area; a luminance detector for detecting the luminance in the symbol reading area; and a light source driving circuit for adjusting the quantity of light controlling the fight source until a predetermined level of luminance is reached.

Accordingly, by using the ambient light in an advantageous manner and supplementing the available light from the light source, the data symbol reader according to the invention reduces power consumption.

Preferably, the data symbol reader includes an ambient light window for introducing ambient light into the symbol reading area. Further preferably, the luminance detector is responsive to both ambient light and the illumination from the light source.

In one particular embodiment, the light source driving circuit includes a comparing device for comparing the detected luminance with a lower limit of a predetermined range of luminance, wherein the predetermined level of luminance is the lower limit of a predetermined range; and an adjusting device for adjusting the quantity of light emitted by the light source, in response to the comparison of the detected luminance value and the lower limit. The adjusting device increases the quantity of light emitted by the light source until the luminance value reaches the lower limit.

In this manner, the light supplied is increased, to supplement the ambient light, with an especially advantageous reduction in power consumption. Preferably, the adjusting device increases the quantity of light emitted by the light source in a stepwise fashion, incrementally increasing the quantity of light emitted by the light source in response to the detected luminance in the symbol reading area until the luminance value reaches the lower limit. Further preferably, the adjusting device first sets the quantity of light emitted by the light source to a minimum level before increasing the quantity of light emitted by the light source until the luminance value reaches the lower limit.

In another particular embodiment, the light source driving circuit includes a comparing device for comparing the detected luminance with an upper limit of a predetermined range of luminance, wherein the predetermined level of luminance is the upper limit of predetermined range; and an adjusting device for adjusting the quantity of light emitted by the light source, in response to the comparison of the detected luminance value and the upper limit. The adjusting means decreasing the quantity of light emitted by the light source until the luminance value reaches the upper limit.

In this manner, a more than sufficient amount of light is supplied, and the illumination is decreased until sufficient light is available from the light source and the ambient supply, reaching the proper exposure level faster, while still having a reduction in the power consumption. Preferably, the adjusting device decreases the quantity of light emitted by the light source in a stepwise fashion, incrementally decreasing the quantity of light emitted by the light source in response to the detected luminance in the symbol reading area until the luminance value reaches the upper limit. Further preferably, the adjusting device first sets the quantity of light emitted by the light source to a maximum level before decreasing the quantity of light emitted by the light source until the luminance value reaches the upper limit.

In still another embodiment, the light source driving circuit includes a comparing device for comparing the detected luminance with a predetermined range of luminance, wherein the predetermined level of luminance is one of an upper limit and a lower limit of the predetermined range; a first adjusting device for adjusting the quantity of light emitted by the light source, in response to the comparison of the detected luminance value and the lower limit, the first adjusting device increasing the quantity of light emitted by the light source until the luminance value reaches the lower limit; and a second adjusting device for adjusting the quantity of light emitted by the light source, in response to the comparison of the detected luminance value and the upper limit, the second adjusting device decreasing the quantity of light emitted by the light source until the luminance value reaches the upper limit.

Accordingly, the data symbol reader can either increase the illumination for optimum reduction in power consumption, or decrease the illumination for faster response while still reducing power consumption.

In this case, the data symbol reader preferably includes a mode selection switch for selecting one of (i) the lower limit and the first adjusting device and (ii) the upper limit and the second adjusting device. In this manner, the user can select which one of the first or second adjusting means suits a particular situation.

DETAILED DESCRIPTION OF THE PREFERRED EMBODIMENTS

Figure 2:
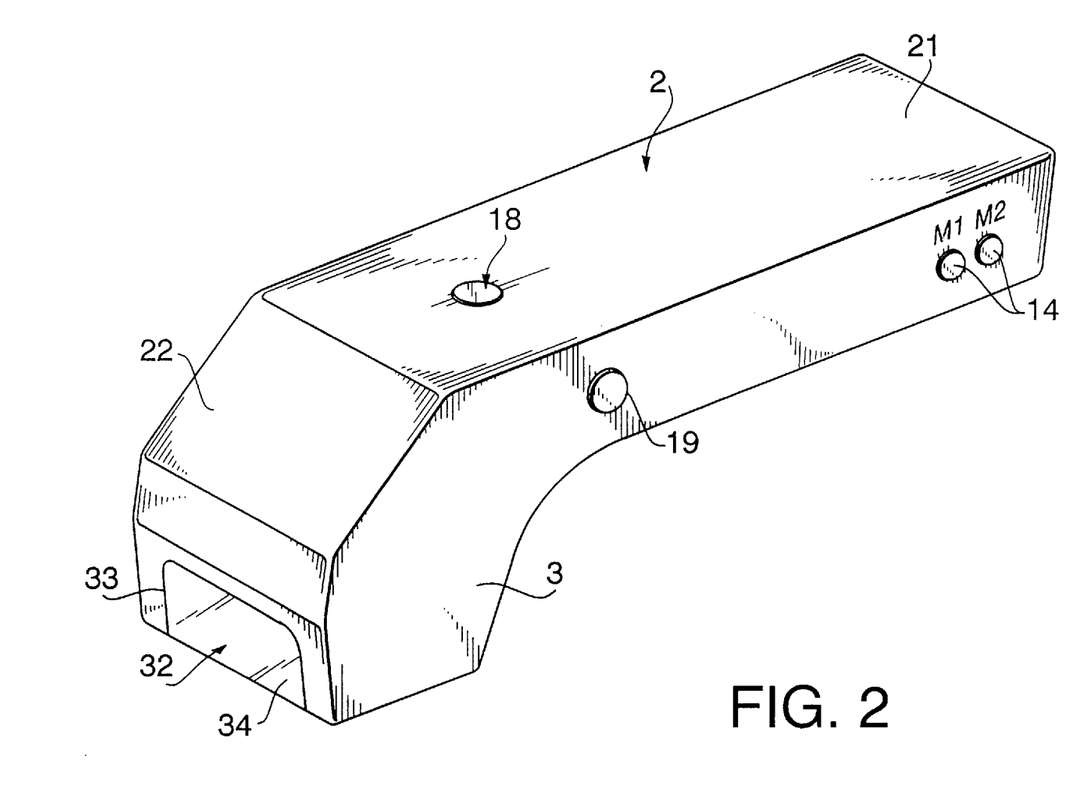
FIG. 2 is a perspective view showing an embodiment of the data symbol reading device according to the invention.
Figure 3:
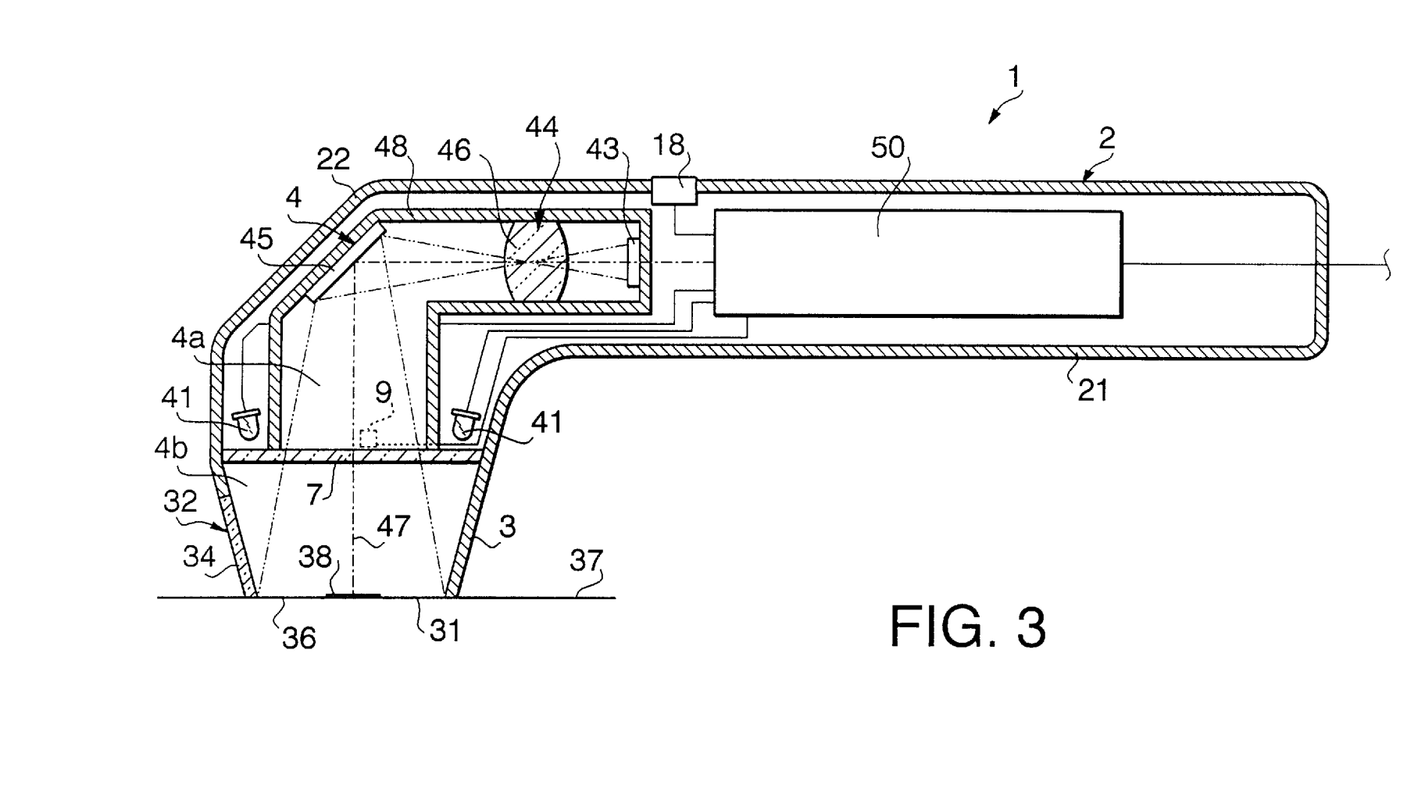
FIG. 3 is a sectional side view of the data symbol reading device shown in FIG. 2.
Figure 4:
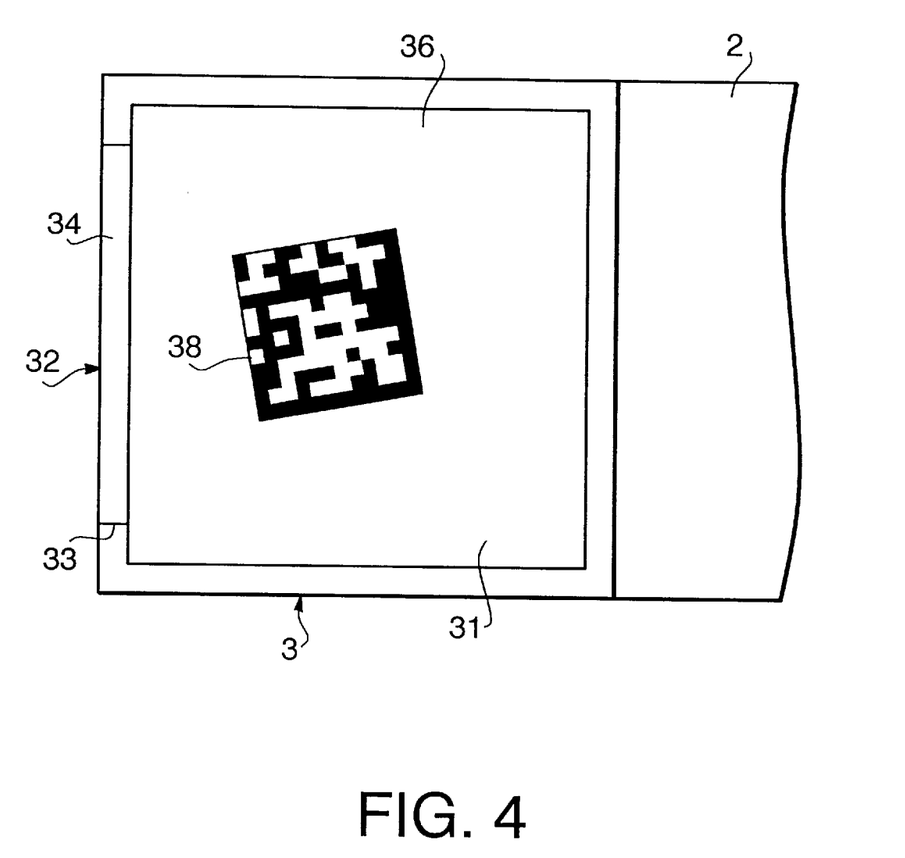
FIG. 4 is a bottom view of the housing of the data symbol reading device shown in FIG. 2.

FIG. 2 is a perspective view of an embodiment of a data symbol reading device according to the invention; FIG. 3 is a sectional side view of the data symbol reading device shown in FIG. 2, FIG. 4 is a bottom view of the housing of the data symbol reading device shown in FIG. 2, and FIG. 5 is a block diagram of the circuit arrangement of the data symbol reading device shown in FIG. 2.

Figure 5:
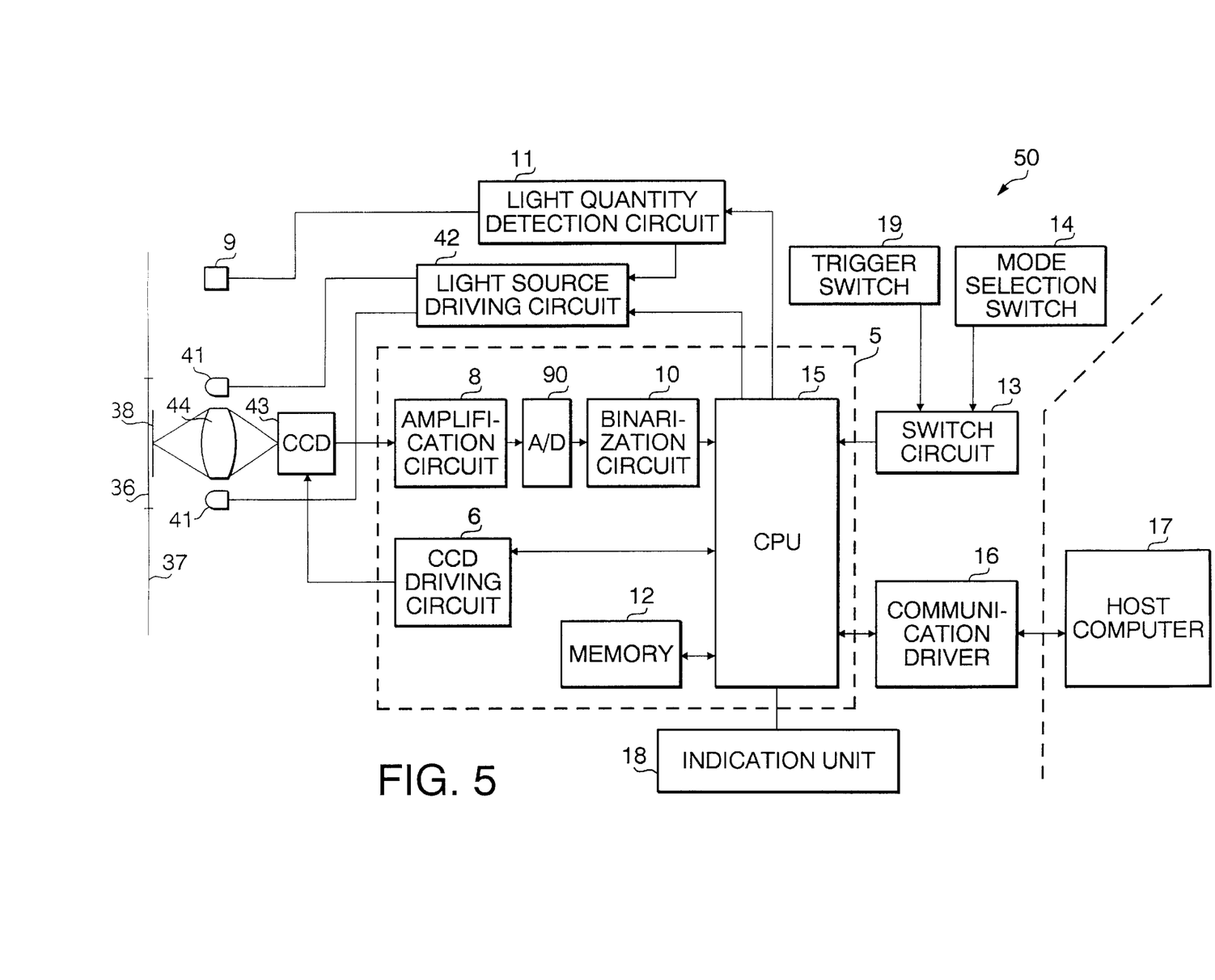
FIG. 5 is a block diagram showing a circuit arrangement of the data symbol reading device shown in FIG. 2.

With reference to FIGS. 2 through 5, the data symbol reading device 1 according to the invention has a casing 2 including a grip part 21 and a head part 22. The head part 22 is formed at the end of the grip part 21. The casing 2 houses a reading unit 4, and a control circuit 50. As shown in FIG. 5, the control circuit 50 includes a signal processing circuit 5, a light source driving circuit 42, and a communication driver 16.

The exterior of the casing 2 is provided with an indication section 18, an trigger switch 19, and a mode selection switch 14. The indication section 18 is on an easily visible surface of the casing 2. The trigger switch 19 is, for example, a push button or trigger type switch, and is used to activate the reading function of the data symbol reading device 1.

The reading unit 4 includes two light sources 41, 41, a charge coupled device (CCD) 43 as an image sensing device, an optical system 44, and a supporting member 48. The optical system 44 guides light from the symbol reading area 36 to form an image on the light receiving surface of the CCD 43. In the present embodiment, the light is reflected from the surface of the data symbol 36. The optical system 44 includes a mirror 45 and a lens group 46. The mirror 45 bends the path of the reflected light 47 from the symbol reading area 36 at nearly a right angle. The lens (or lens group) 46, causes the light reflected by the mirror 45 to form an image on the light receiving surface of the CCD 43.

The two light sources 41 illuminate the symbol reading area 36, and are set in a substantially symmetrical manner with respect to the light path 47. A light emitting element such as an LED, a halogen lamp, a semiconductor laser, or the like can be used as the light source 41. A diffuser plate (not shown) with a rough or translucent surface may be installed at the light emitting side of light source 41, in order to make the luminance at the symbol reading area 36 more uniform. The diffuser plate can alternatively be formed by roughening a surface of a transparent plate 7 (described later). The light sources 41 are connected to and are controlled by a light source driving circuit 42 in the control circuit 50.

A photosensor 9 for detecting the luminance of symbol reading area 36 is installed near reading unit 4. This photosensor 9 is, for example, a photodiode. A light quantity detection circuit 11 converts a current received from the photosensor 9 into voltage determined by the quantity of light, performs A/D conversion of the voltage, and outputs the result as photometric value luminance data (representing the light amount in the symbol reading area 36) to the CPU 15 and to the light source driving circuit 42.

In a first mode of operation (described later) the CPU 15 compares a predetermined preset threshold value (corresponding to the lower limit of an appropriate luminance range) and the input photometric value. If the photometric value is lower than the threshold value, the CPU 15 outputs an enable signal, and further outputs a first initial driving current value (the driving current for obtaining a quantity of light that substantially corresponds to the quantity of light of the abovementioned lower limit) to the light source driving circuit 42.

In a second mode of operation (also described later) the CPU 15 outputs an enable signal and a second initial driving current value (the driving current for obtaining a quantity of light that substantially corresponds to the quantity of light of the upper limit of the appropriate luminance range) to the light source driving circuit 42.

When an enable signal is received from the CPU 15, the light source driving circuit 42 drives the light source 41 with the first or second driving currents as above. The CPU further performs feedback control of the driving current for the light source (LED) 41 based on the difference between a reference value (corresponding to the lower limit in the first mode of operation and to the upper limit in the second mode of operation) and the photometric value luminance data so that the photometric value becomes equal to the reference value.

The CCD 43 has many photodiode light receiving (or picture) elements disposed in an array. Each of the picture elements accumulates an electrical charge corresponding to the amount of light received, and sequentially transfers the charge at a predetermined time. The transferred charges are readable (analog) image signals.

The symbol reading area 36 is formed on a reference plane 37, representing the surface upon which the data symbol 38 is positioned. The symbol reading area 36 is a predetermined area illuminated by the light source 41. The light reflected from the symbol reading area 36 is sent to the CCD 43. The symbol reading area 36 substantially coincides with or includes the front opening 31 of the housing 3 (described later), and is included in the effective sensing area of the CCD 43.

As shown in FIG. 4, the data symbol 38 consists of a tessellated pattern of black and white cells (alternatively, black and transparent cells) which are arranged in an array. The array has no less than 2 columns (i.e., x columns, where x>1) and rows (i.e., y rows, where y>1) of cells. In this way, each cell can express 0 or 1 in a binary system and information can be specified by a combination of these cells. However, the data symbol 38 readable by the data symbol reading device is not restricted to the illustrated arrangement.

The head part 22 of the casing 2 includes a housing 3 extending from the position of the reading unit 4 to the symbol reading area 36. The housing 3 has a rectangular opening 31 opposing the reading unit 4. The housing 3 substantially surrounds both the light path of the illuminating light from the light sources 41, and the light path 47 of the light reflected from the symbol reading area 36. In this embodiment, the housing 3 is rectangular in a cross section parallel to the plane of the symbol reading area 36.

The housing 3 maintains the reading unit 4 at a predetermined distance (i.e., a predetermined optical path length) from the symbol reading area 36. The housing 3 length is set to maintain the reading unit 4 at the predetermined distance such that when the front end of the housing 3 comes in contact with the reference plane 37, the light from the symbol reading area 36 will pass through the optical system 44 and form an image on the light receiving surface of the CCD 43.

A transparent plate 7 is installed substantially normal to the light path 47 in the interior of the housing 3 at the inner side of the front opening 31. The transparent plate 7 prevents debris, dirt, and moisture from entering the reading unit 4 and the interior of the casing 2. The transparent plate 7 is installed at a position near the end of the supporting member 48, and partitions the internal space of the housing 3 into a reading unit side space 4a and a front opening side space 4b. The transparent plate 7 can be formed from glass or plastic, and as described above, the transparent plate 7 can alternatively be used as a diffuser for the light sources 41 instead of providing a separate diffuser plate.

The housing 3 has an ambient light window 32 for introducing ambient light into symbol reading area 36. The ambient light window 32 includes a front-side opening 33 formed on the front face of housing 3, and a diffuser plate 34 fitted into the front-side opening 33. The diffuser plate 34 in, for example, a surface-roughened transparent or translucent plate. The ambient light is diffuse after passing through the diffuser plate 3, entering the housing 3 to illuminate the symbol reading area 36. The symbol reading area 36 can thereby be illuminated at a uniform luminance by the ambient light.

An indication unit 18 including a light emitting diode (LED), is provided on the upper face of casing 2. The indication unit 18 is lit, for example, in green when the luminance of symbol reading area 36 is suitable, i.e., when the photometric value is within the appropriate range. Although the indication unit 18 includes an LED in the present embodiment, the indication unit 18 may alternatively be a liquid crystal display (LCD) or a CRT.

The control circuit 50 of the data symbol reading device 1 includes a signal processing circuit 5 for processing the image signals received from the reading unit 4. As shown in FIG. 5, the signal processing circuit 5 includes a CCD driving circuit 6, an amplification circuit 8, a binarization circuit 10, a memory 12, and a central processing unit (CPU) 15 as a control means.

The CPU 15 is further connected to the light source driving circuit 42, the communication driver 16, a switch circuit 13 (for the trigger switch 19 and the mode selection switch 14), and the indication unit 18. The power for the device can be supplied, for example, from a host computer.

The CPU 15 controls the light source driving circuit 42 at appropriate times to supply power to the light sources 41, for example, when the trigger switch 19 is turned ON. In this embodiment, the lighting duration of the light sources 41 is set to a predetermined time by the light source driving circuit 42 or the CPU 15.

The mode selection switch 14 allows selection between the first mode of operation and second mode of operations related to the driving of light sources 41.

In the first mode of operation, ambient light is initially used, and additional illumination from the light sources 41 is added to compensate for any inadequacies in the luminance of symbol reading area 36. In the first mode of operation, the photometric value (detected luminance value) detected by the photosensor 9 is compared with the lower limit of an appropriate luminance range (stored in advance in the memory built into the CPU 15). If the value is less than the lower limit, the light sources 41 are driven to increase the quantity of light emitted by the light sources 41 until the photometric value reaches the abovementioned lower limit.

In the second mode of operation, the light sources 41 are first driven to emit the maximum amount of light, and the strength of light emission is then decreased until the luminance of symbol reading area 36 is sufficient. That is, in second mode of operation, light sources 41 are first lit to provide the maximum quantity of light emitted. If the photometric value detected by the photosensor 9 is found to be greater than the upper limit of an appropriate luminance range (stored in advance is the memory built into the CPU 15) upon comparison of the photometric value and the upper limit, the amount of light from the light sources 41 is decreased until the photometric value reaches the abovementioned upper limit.

Mode Control

Figure 6:
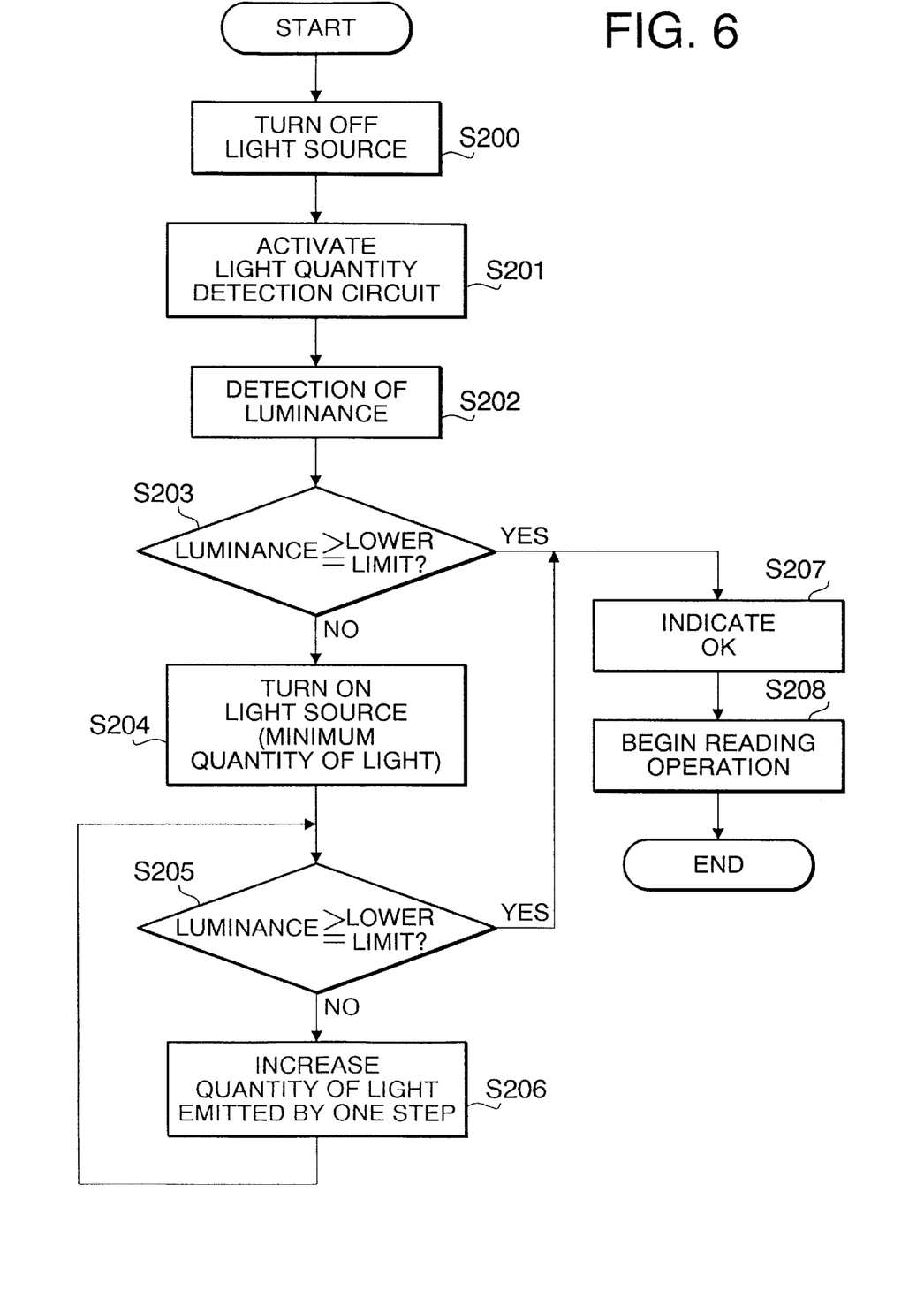
FIG. 6 is a flowchart showing driving control of the light source in a first mode of operation.
Figure 7:
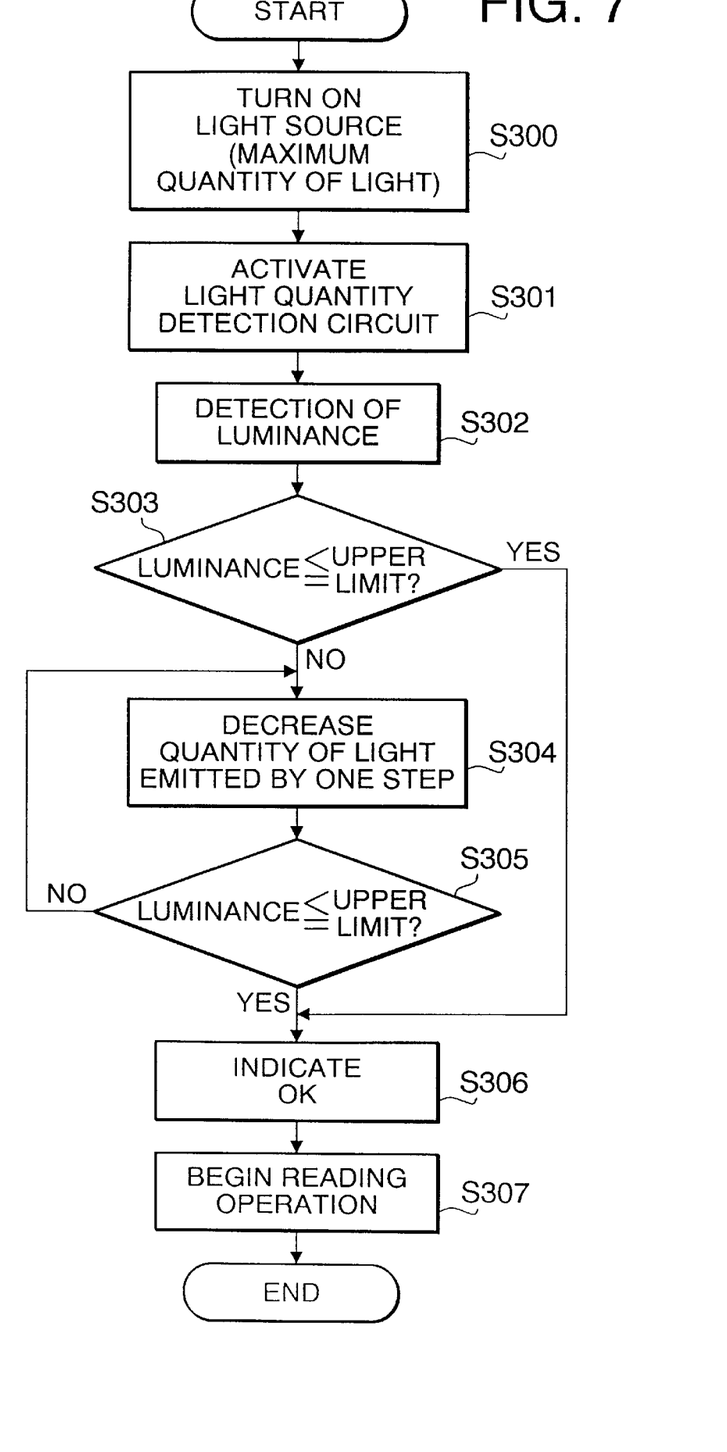
FIG. 7 is a flowchart which shows driving control of the light source in a second mode of operation.

FIG. 6 is a flowchart showing the control operation of the driving of the light sources in the first mode of operation, and FIG. 7 is a flowchart showing the control operation of the driving of the light sources in the second mode of operation. The first and second modes, in combination with the control circuit 5 and light quantity detection circuit 11, form portions of a comparing and adjusting device for controlling the amount of light emitted by the light sources 41.

In the first mode of operation, as shown in FIG. 6, when the trigger switch 19 is turned ON (with the power switch being ON), the two light sources 41 are turned off (if on) in step S200. The light quantity detection circuit 11 is then activated in step S201, and the luminance of the symbol reading area 36 is detected by photosensor 9 in step S202.

In step S203, the photometric value detected by photosensor 9 is then compared with the lower limit of the appropriate luminance range stored in advance in the memory built into the CPU 15. If the photometric value is greater than or equal to the lower limit (Y in step S203), the luminance is within the appropriate luminance range, and the LED of indication unit 18 is lit in step 3207 to indicate that the luminance (exposure) is appropriate (OK). Subsequently, the data symbol 38 reading operation is started in step S208. The process is then ended.

If the photometric value is not greater than or equal to the lower limit (N in step S203), then in step S204, the light source driving circuit 42 is activated, and the two light sources 41 are lit with a first initial driving current to provide a minimum quantity of emitted light.

The light quantity detection circuit is still active. In step S205, the photometric value detected by photosensor 9 is again compared with the lower limit of the appropriate luminance range. If the photometric value is greater than or equal to this lower limit (Y in step S205), the luminance is within the appropriate luminance range, and the abovementioned steps S207 and S208 are executed successively, and the process is then ended.

If the photometric value is not greater than or equal to the lower limit (N in step S205), then in step S206, the driving current is increased by a predetermined amount by the light source driving circuit 42, and process loops back to step S205.

The quantity of light emitted by the light sources 41 is thus increased in a stepwise fashion until the photometric value reaches the lower limit of the appropriate luminance range.

That is, steps S205 and S206 are executed repeatedly, and when the photometric value reaches the lower limit of the appropriate luminance range, an OK indication is indicated by indication unit 18 (step S207) and the symbol data 38 reading operation is started (step S208).

In the second mode of operation, as shown in FIG. 7, when the trigger switch 19 is turned ON (with the power switch being ON), the two light sources 41 are turned on (if off) in step S300. The light quantity detection circuit 11 is then activated in step S301, and the luminance of the symbol reading area 36 is detected by photosensor 9 in step S302.

In step S303, the photometric value detected by photosensor 9 is then compared with the upper limit of the appropriate luminance range stored in advance in the memory built into the CPU 15. If the photometric value is less than or equal to the upper limit (Y in step S303), the luminance is within the appropriate luminance range, and the LED of indication unit 18 is illuminated in step S306 to indicate that the luminance (exposure) is appropriate (i.e., an OK condition). Subsequently, the data symbol 38 reading operation is started in step S307. The process is then ended.

If the photometric value is not less than or equal to the lower limit (N in step S303), then in step S304, the driving current is decreased by a predetermined amount by the light source driving circuit 42 to decrease the amount of light emitted by the light sources 41.

The light quantity detection circuit is still active. In step S305, the photometric value detected by photosensor 9 is again compared with the upper limit of the appropriate luminance range. If the photometric value is less than or equal to this upper limit (Y in step S305), the luminance is within the appropriate luminance range, and the abovementioned steps S306 and S307 are executed successively, and the process is then ended.

If the photometric value is not less than or equal to the upper limit (X in step S305), then the process loops back to step S304. The quantity of light omitted by the light sources 41 is thus decreased in a stepwise fashion until the photometric value reaches the upper limit of the appropriate luminance range. That is, steps S304 and S305 are executed repeatedly, and when thee photometric value reaches the upper limit of the appropriate luminance range, an OK indication is made by the indication unit 18 in (step S306) and the symbol data 38 reading operation is started (step S307).

Since reading is performed near the lower limit of the appropriate luminance range in the first mode of operation, the power consumption is less in the first mode of operation than with the second mode of operation. However, since the quantity of light emitted in the second mode of operation is decreased from a more than sufficient level, the second mode of operation is faster, with less time passing until the start of reading.

When the reading operation is started in the first mode of operation or the second mode of operation as described above, the CPU 15 further activates the CCD driving circuit 6. A horizontal CCD driving pulse and a vertical CCD driving pulse are output from the CCD driving circuit 6 to the CCD 43 to control the accumulation and transfer of charge at the CCD 43.

Clock signals are also generated at the CCD driving circuit 6. For example, composite clock signals, having a horizontal synchronization signal and a vertical synchronization signal combined with a clock signal, are transmitted from the CCD driving circuit 6 to the CPU 15.

The amplification circuit 8 is connected to the CCD 43, and amplifies the (analog) image signals from the CCD 43. The analog image signals are converted into digital image signals (for example, 8-bit image signals) by an A/D converter 90 and then input into the binarization circuit 10.

In the binarization circuit 10, the digital image signals from each picture element are turned into a binary value of "1" or "0" according to predetermined threshold data. A binarized data value of "1" corresponds to a black part of the data symbol 38 while a value of "0" corresponds to a white part. The binarized data output from the binarization circuit 10 are transferred through the CPU 15 and stored in predetermined addresses in the memory 12 by means of an address counter included in the CPU 15. This address counter is driven according to the composite clock signals input from the CCD driving circuit 6.

In the reading operation, firstly, the binarized data are read sequentially from the memory 12 in accordance with the addresses designated by the address counter (the read order may be reversed with respect to the storage order). The CPU 15 performs any necessary image processing, for example, image inversion, extraction of only binarized data for the data symbol 38 based on the coordinate data of the border picture images, dropout correction, rotation, and the like, are then performed on the binarized data for one image. The CPU 15 also decodes the binarized data into useable data in accordance with the decoding system for the particular type of the data symbol 38. The decoded data is then sent via the communication driver 16 to an externally connected host computer 17. The host computer 17 may be, for example, a personal computer or a work station. The storage and tabulation of the useable data are then performed on the host computer 17.

The invention is not limited to the illustrated embodiment of a data symbol reading device. For example, the transverse cross-sectional shape of the housing 3 does not have to be a rectangular shape as illustrated, and may be a polygonal shape (such as a triangular, hexagonal, or octagonal shape) a circular shape, an elliptical shape, or any other shape.

Furthermore, the ambient light window 32 may also be equipped with a light-gathering device, such as a lens, for gathering the ambient light. Still further, the position of the ambient light window is not restricted to the front side of housing 3, and may be the side or rear of the housing 3, the upper part of the head unit 22, or any other position. In such a case, a light guide (for example, an optical fiber) for guiding the gathered ambient light to the symbol reading area 36 may be installed between the ambient light window and the symbol reading area.

Also, although a photosensor 9 is used as a luminance detection device, the CCD (image sensing device) 43 may be arranged to detect luminance.

As described, since the symbol reading area is illuminated by both ambient light and light from a light source, the power consumption due to illumination is low. Because of the low power consumption, a battery or cell may be used as a power supply instead of an AC power supply (a source of noise). The lifetime of the battery or storage cell is extended, and the deterioration of the light source and associated parts is reduced.

Furthermore, the quantity of light emitted by the light source is automatically adjusted based on the directly detected luminance of the symbol reading area (as detected by the luminance detection system). Accordingly, the luminance of the symbol reading area is feedback controlled within an appropriate luminance range, allowing a controlled exposure, thereby enhancing the reading reliability.

Still further, when a first and second modes of operation are provided as described, a selection can be made between the two modes and the applicability of the device in various situations is increased.

The present disclosure relates to subject matter contained in Japanese Patent Application No. HEI 07-161462, filed on Jun. 5, 1995, which is expressly incorporated herein by reference in its entirety.

What is claimed is:

1. A data symbol reader, comprising:

an image sensing device;

an optical system for forming an image of a data symbol, located in a symbol reading area, on said image sensing device;

a light source for illuminating the symbol reading area;

a luminance detector, for detecting a luminance in the symbol reading area;

a light source driving circuit for controlling a quantity of light emitted by the light source in accordance with a detected luminance in the symbol reading area wherein said light source driving circuit comprises:

comparing means for comparing said detected luminance with a predetermined luminance level of an acceptable luminance range, wherein said predetermined luminance level is one of an upper limit and a lower limit of said acceptable luminance range;

first adjusting means for adjusting the quantity of light emitted by said light source, in response to said comparison of said detected luminance with said lower limit of said acceptable luminance range, said first adjusting means increasing the quantity of light emitted by said light source until said detected luminance reaches said lower limit of said acceptable luminance range; and second adjusting means for adjusting the quantity of light emitted by said light source, in response to said comparison of said detedted luminance with said upper limit of said acceptable luminance range, said second adjusting means decreasing the quantity of light emitted by said light source until said detected luminance reaches said upper limit of said acceptable luminance range; and a casing, at least said image sensing device, said optical system, said light source and said luminance detector being positioned in said casing, said casing provided with walls which contact a surface on which the data symbol is located to read the data symbol, said casing further including an ambient light window for introducing ambient light into said symbol reading area, said luminance detector being responsive to both said ambient light and to illumination from said light source.

2. The data symbol reader according to claim 1, wherein said luminance detector is responsive to both said ambient light and said illumination from said light source.

3. The data symbol reader according to claim 1, said ambient light window including:

a diffuser plate for diffusing ambient light passing into the symbol reading area.

4. The data symbol reader according to claim 1, wherein said adjusting means increases the quantity of light emitted by the light source in a stepwise fashion, incrementally increasing the quantity of light emitted by the light source in response to said detected luminance in the symbol reading area until the luminance value reaches said lower limit.

5. The data symbol reader according to claim 1, further comprising:

a mode selection switch for selecting one of said lower limit and said first adjusting means, and said upper limit and said second adjusting means.

6. The data symbol reader according to claim 1, wherein said first adjusting means first sets the quantity of light emitted by said light source to a minimum level before increasing the quantity of light emitted by said light source until the luminance value reaches said lower limit, and wherein said second adjusting means first sets the quantity of light emitted by said light source to a maximum level before decreasing the quantity of light emitted by said light source until the luminance value reaches said upper limit.

7. The data symbol reader according to claim 1, wherein said first adjusting means increases the quantity of light emitted by the light source in a stepwise fashion, incrementally increasing the quantity of light emitted by the light source in response to said detected luminance in the symbol reading area until the luminance value reaches said lower limit, and wherein said second adjusting means decreases the quantity of light emitted by the light source in a stepwise fashion, incrementally decreasing the quantity of light emitted by the light source in response to said detected luminance in the symbol reading area until the luminance value reaches said upper limit.

8. The data symbol reader according to claim 1, wherein the data symbol is a two-dimensional data symbol.

9. The data symbol reader according to claim 1, said light source driving circuit controlling a quantity of light emitted by the light source such that said illumination from said light source supplements the available ambient light.

10. The data symbol reader according to claim 1, said light source driving circuit being operable in accordance with a first mode, which conserves power by utilizing a lower acceptable light luminance level, and in accordance with a second mode, which provides rapid reading by utilizing an upper acceptable light luminance level.

11. The data symbol reader according to claim 1, said reader being operable in accordance with a first mode in which said luminance detector is operated prior to actuation of said light source and a second mode of operation in which said light source is actuated prior to operation of said luminance detector.

12. The data symbol reader according to claim 1, said casing having an opening and having a length along a direction perpendicular to said opening of said casing such that when said casing is positioned with said opening contacting a symbol reading area, an image of said data symbol is formed on a light receiving surface of said image sensing device.

13. A data symbol reader, comprising:

an image sensing device;

an optical system for forming an image of a data symbol, located in a symbol reading area, on said image sensing device;

a light source for illuminating the symbol reading area;

a luminance detector, for detecting a luminance in the symbol reading area;

a light source driving circuit for controlling a quantity of light emitted by the light source in accordance with a detected luminance in the symbol reading area; and a casing, at least said image sensing device, said optical system, said light source and said luminance detector being positioned in said casing, said casing provided with walls which contact a surface on which the data symbol is located to read the data symbol, said casing further including an ambient light window for introducing ambient light into said symbol reading area;

said light source driving circuit comprising means for comparing said detected luminance with a predetermined luminance level, said predetermined luminance level being a lower limit of an acceptable luminance range; and adjusting means for adjusting the quantity of light emitted by said light source, in response to said comparison of the detected luminance with said lower limit, said adjusting means increasing the quantity of light emitted by said light source until the detected luminance reaches said lower limit;

said adjusting means first setting the quantity of light emitted by said light source to a minimum level before increasing the quantity of light emitted by said light source until said detected luminance reaches said lower limit.

14. The data symbol reader according to claim 13, said ambient light window including a diffusing plate for diffusing ambient light passing into said symbol reading area.

15. The data symbol reader according to claim 13, said luminance detector being responsive to both ambient light and to illumination from said light source.

16. The data symbol reader according to claim 13, said data symbol comprising a two-dimensional data symbol.

17. The data symbol reader according to claim 13, said light source driving circuit controlling a quantity of light emitted by the light source such that said illumination from said light source supplements available ambient light.

18. The data symbol reader according to claim 13, said casing having an opening and having a length along a direction perpendicular to said opening of said casing such that when said casing is positioned with said opening contacting a symbol reading area, an image of said data symbol is formed on a light receiving surface of said image sensing device.

19. A data symbol reader, comprising:

an image sensing device;

an optical system for forming an image of a data symbol, located in a symbol reading area, on said image sensing device;

a light source for illuminating the symbol reading area;

a luminance detector, for detecting a luminance in the symbol reading area;

a light source driving circuit for controlling a quantity of light emitted by the light source in accordance with a detected luminance in the symbol reading area; and a casing, at least said image sensing device, said optical system, said light source and said luminance detector being positioned in said casing, said casing provided with walls which contact a surface on which the data symbol is located to read the data symbol, said casing further including an ambient light window for introducing ambient light into said symbol reading area;

said light source driving circuit comprising means for comparing said detected luminance with a predetermined luminance level, said predetermined luminance level being an upper limit of an acceptable luminance range, and adjusting means for adjusting the quantity of light emitted by the light source, in response to said comparison of said detected luminance with said upper limit, said adjusting means decreasing the quantity of light emitted by the light source until the detected luminance reaches said upper limit, said adjusting means first setting the quantity of light emitted by said light source to a maximum level before decreasing the quantity of light emitted by said light source until said detected luminance reaches said upper limit.

20. The data symbol reader according to claim 19, wherein said adjusting means decreases the quantity of light emitted by the light source in a stepwise fashion, incrementally decreasing the quantity of light emitted by the light source in response to said detected luminance in the symbol reading area until the luminance value reaches said upper limit.

21. The data symbol reader according to claim 19, said ambient light window including a diffusing plate for diffusing ambient light passing into the symbol reading area.

22. The data symbol reader according to claim 19, said luminance detector being responsive to both ambient light and to illumination from said light source.

23. The data symbol reader according to claim 19, said data symbol comprising a two-dimensional data symbol.

24. The data symbol reader according to claim 19, said light source driving circuit controlling a quantity of light emitted by the light source such that said illumination from said light source supplements the available ambient light.

25. The data symbol reader according to claim 19, said casing having an opening and having a length along a direction perpendicular to said opening of said casing such that when said casing is positioned with said opening contacting a symbol reading area, an image of said data symbol is formed on a light receiving surface of said image sensing device.

* * * * *

UNITED STATES PATENT AND TRADEMARK OFFICE
CERTIFICATE OF CORRECTION

PATENT NO. : 5,808,286
DATED : September 15, 1998
INVENTOR(S) : Makoto NUKUI et al.

It is certified that error appears in the above-identified patent and that said Letters Patent is hereby corrected as shown below:

At column 10, line 1 (claim 1, line 28) of the printed patent, change "detedted" to ---detected---.

Signed and Sealed this

Twenty-second Day of June, 1999

Attest:

Q. TODD DICKINSON

*Attesting Officer*    *Acting Commissioner of Patents and Trademarks*